United States Patent [19]
Adams

[11] 3,791,668
[45] Feb. 12, 1974

[54] ROLL-OVER PROTECTION STRUCTURE WITH DEFORMABLE LEGS

[75] Inventor: Stanely B. Adams, Yorkville, Ill.

[73] Assignee: Caterpillar Tractor Co., Peoria, Ill.

[22] Filed: June 14, 1972

[21] Appl. No.: 262,552

[52] U.S. Cl. ............................ 280/150 C, 296/102
[51] Int. Cl. .......................................... B62d 25/06
[58] Field of Search ................. 296/102; 280/150 C

[56] References Cited
UNITED STATES PATENTS

| | | | |
|---|---|---|---|
| 3,527,474 | 9/1970 | Boersma | 296/102 |
| 3,656,803 | 4/1972 | Brown | 296/102 |
| 3,578,377 | 5/1971 | Babbitt | 296/102 |
| 3,712,664 | 1/1973 | May | 296/102 |

FOREIGN PATENTS OR APPLICATIONS
1,289,440   4/1966   Germany ........................... 296/102

*Primary Examiner*—David Schonberg
*Assistant Examiner*—Reinhard J. Eisenzopf
*Attorney, Agent, or Firm*—Ralph E. Walters

[57] ABSTRACT

A roll-over protection structure having spaced upright legs including relatively rigid upper end portions, relatively rigid lower end portions secured to a vehicle frame, and central portions of reduced cross sectional areas from the end portions to absorb energy and predictably deform during a vehicle roll-over rather than having the legs fracture at their end portions to minimize the possibility of complete separation of the protection structure from the vehicle.

5 Claims, 6 Drawing Figures

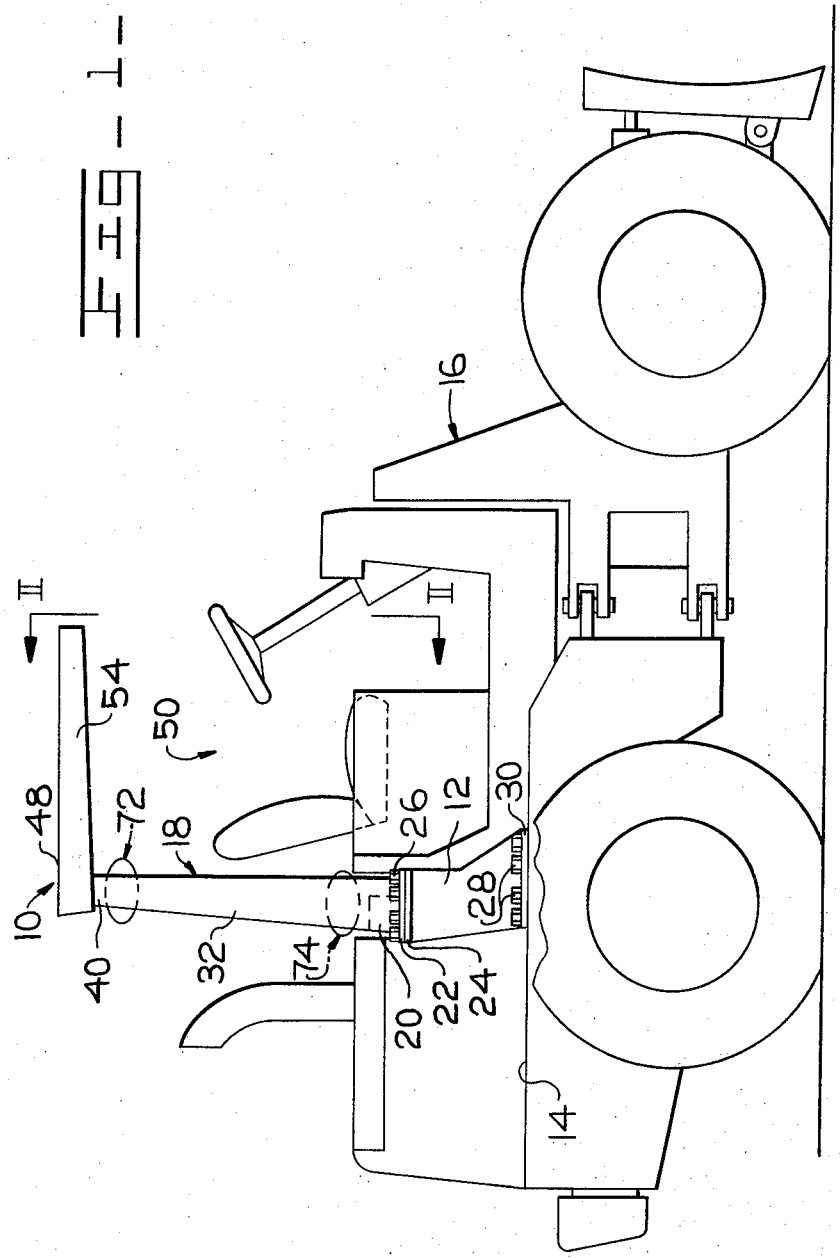

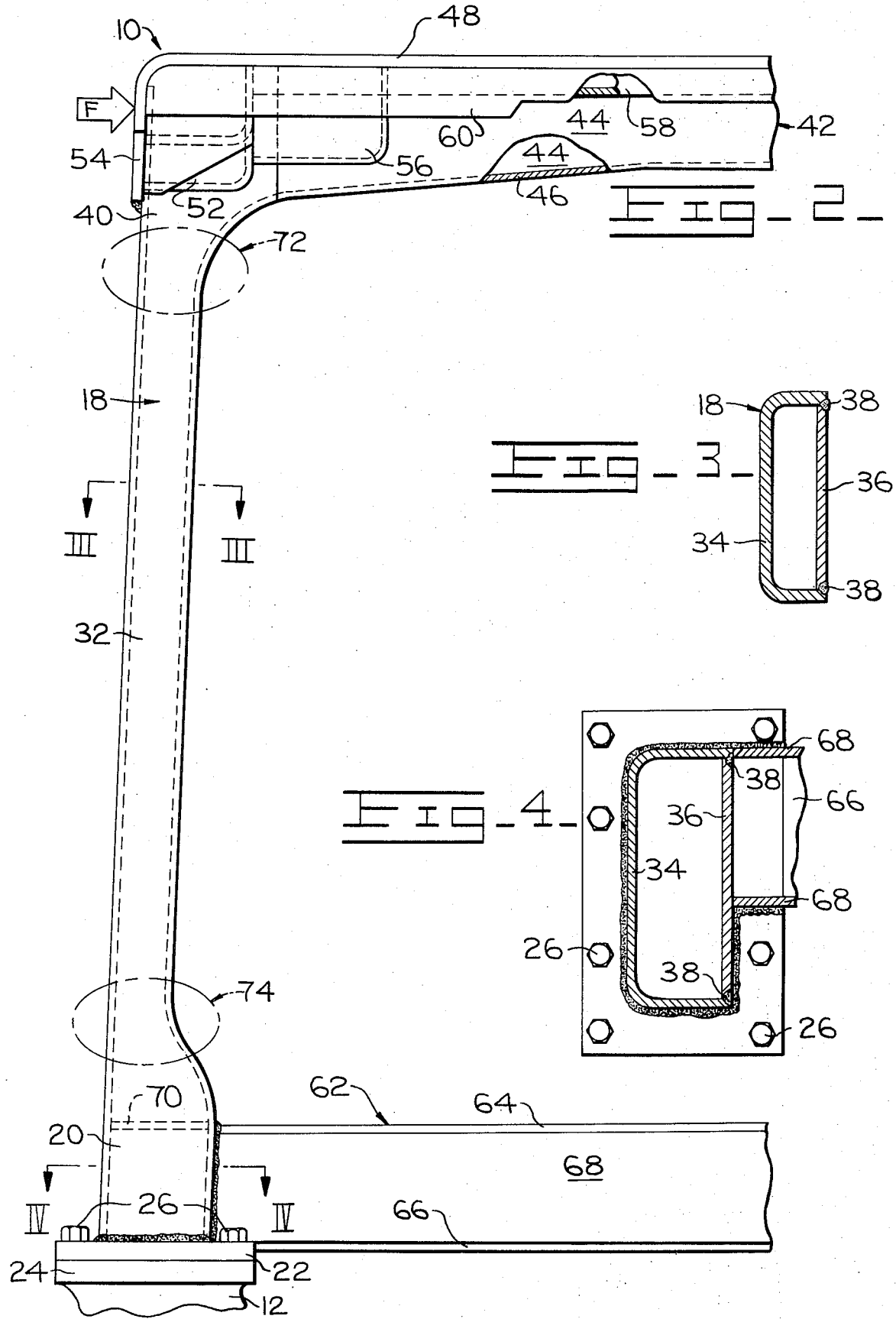

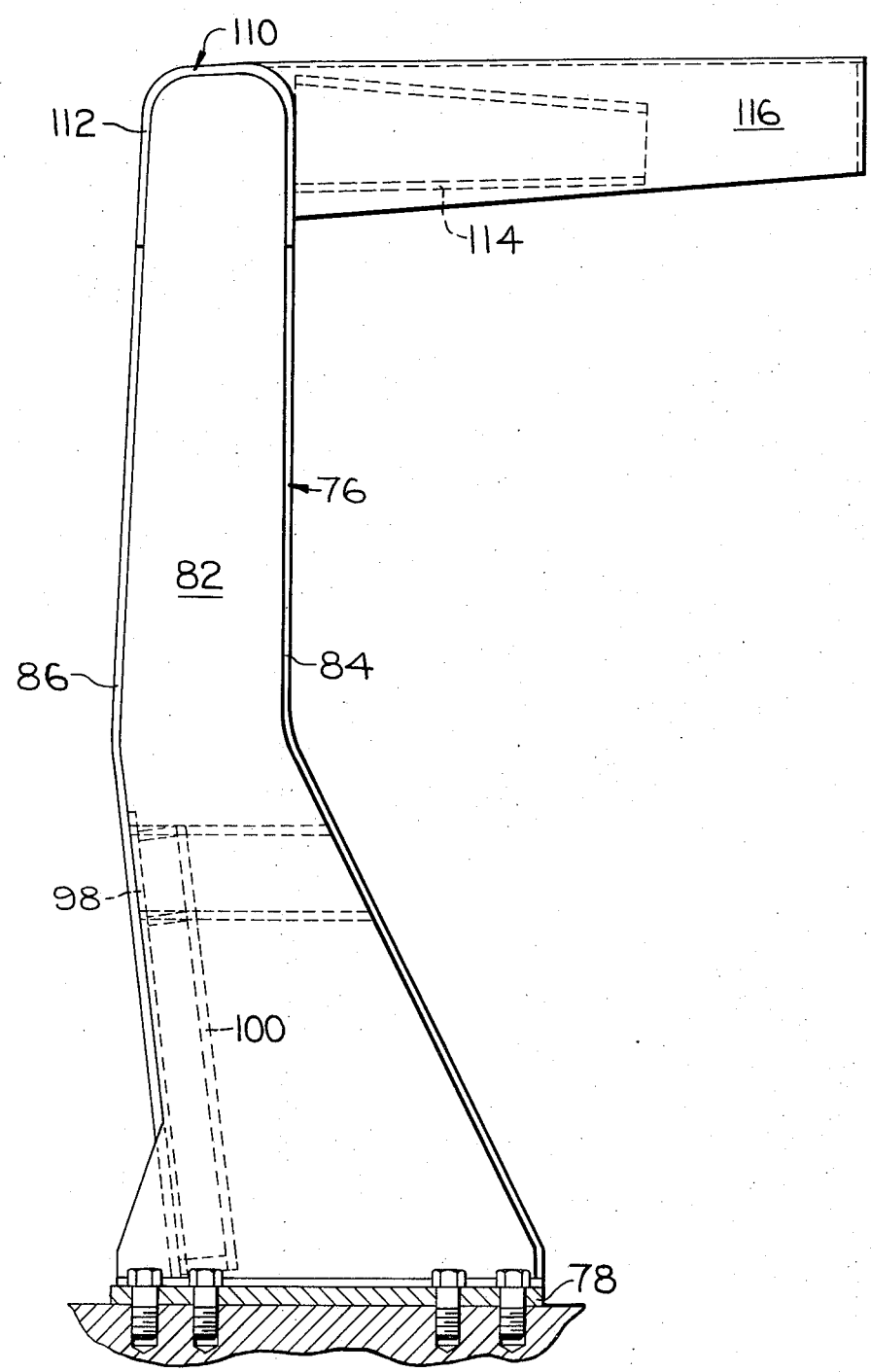

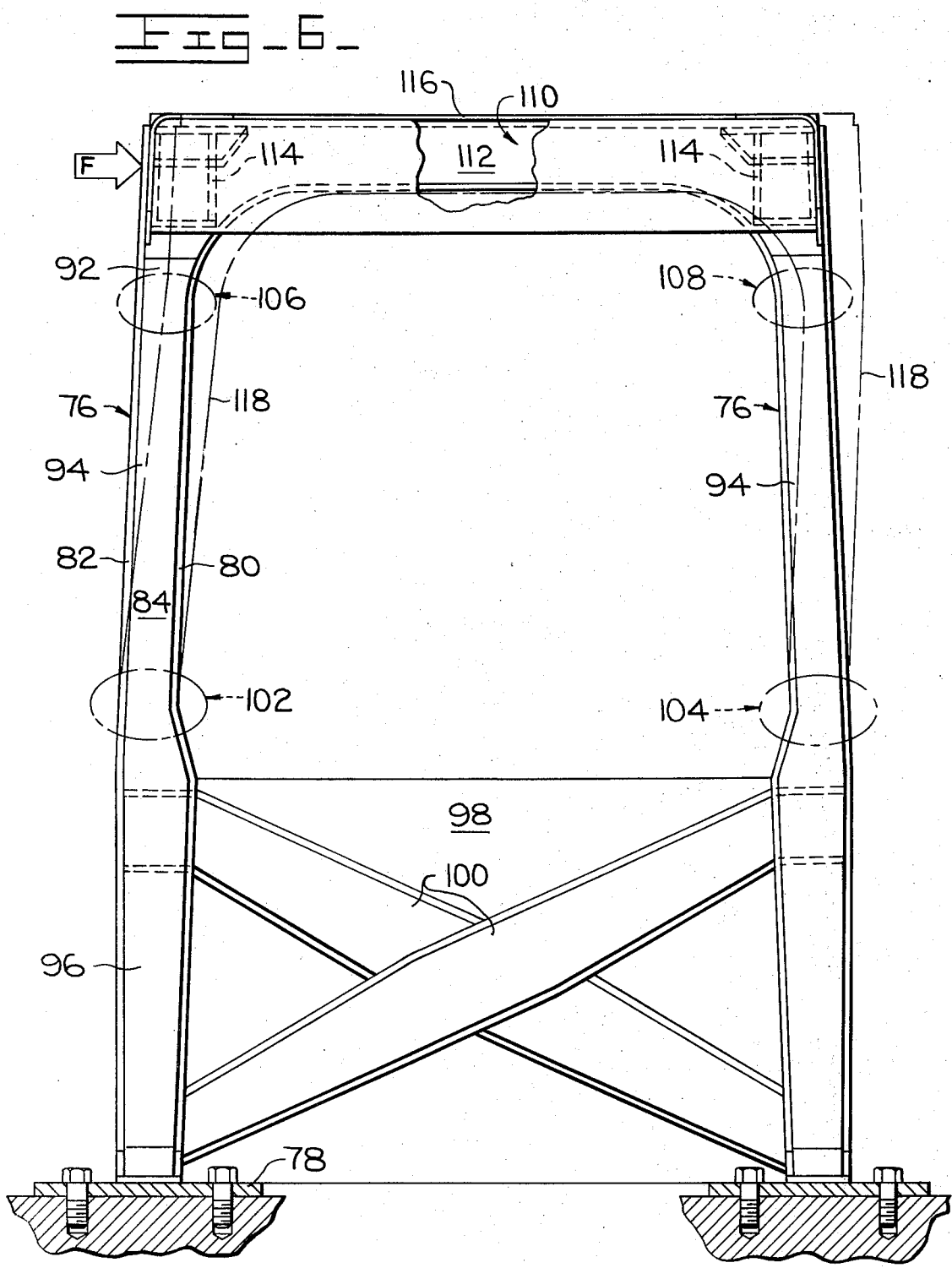

3,791,668

ROLL-OVER PROTECTION STRUCTURE WITH DEFORMABLE LEGS

BACKGROUND OF THE INVENTION

The present emphasis on operator safety has led to an extensive development program for providing roll-over protection structures on earthmoving vehicles. The most obvious approach would be to fabricate a super strong, relatively rigid frame around the operator. However, this is impractical from the standpoint of economics, space limitations on the vehicle, loss of visibility to the operator, changes to the center of gravity and the like. Other structures of the prior art have provided a plurality of substantially uniformly sectioned, rectangular or cylindrical posts which are weldably or otherwise integrally secured to each other above the operator station. While these relatively economical structures are intended to meet the new Government standards, actual tests have shown such structures generally fail by sudden fracture at the weld joints adjacent to their extremities, resulting in complete separation of the protection structure from the vehicle or collapse of the structure on the vehicle. It is believed, therefore, that by controlling the cross section of the legs of the roll-over protection structure, energy will be absorbed in the legs through plastic deformation thereof in predetermined zones least subject to fracture to avoid complete separation of the structure from the vehicle or collapse of the structure on the vehicle.

SUMMARY AND OBJECTS OF THE INVENTION

Accordingly, it is an object of the present invention to provide an improved roll-over protection structure for earthmoving vehicles.

It is another object of the invention to provide such an improved roll-over protection structure having legs which are predictably deformable in specific zones during a vehicle roll-over.

It is another object to provide a roll-over protection structure of the character described having legs providing weldably secured end portions and centrally deformable center portions capable of relatively extensive deformation prior to complete fracturing of the weldments at the end portions of the legs to minimize complete separation of the protection structure from the vehicle.

BRIEF DESCRIPTION OF THE DRAWINGS

FIG. 1 is a side elevational view of a roll-over protection structure embodying the principles of the present invention disposed on a wheel tractor.

FIG. 2 is a somewhat enlarged partial front elevational view of the right half of the roll-over protection structure as viewed in the direction of the arrows on line II—II of FIG. 1.

FIG. 3 is a somewhat enlarged transverse horizontal cross sectional view of the central portion of the leg of the roll-over protection structure taken along the line III—III of FIG. 2.

FIG. 4 is a somewhat enlarged transverse horizontal cross sectional view of a base portion of the leg of the roll-over protection structure taken along the line IV—IV of FIG. 2.

FIG. 5 is a side elevational view of an alternate embodiment of the roll-over protection structure of the subject invention.

FIG. 6 is a front elevational view of the alternate embodiment of the roll-over protection structure of FIG. 5.

DESCRIPTION OF THE PREFERRED EMBODIMENT

With particular reference to FIGS. 1 and 2, a roll-over protection structure shown generally at 10 is removably secured through a pair of intermediate support brackets 12 to a relatively rigid pair of horizontally and generally longitudinal vehicle frame elements 14 disposed on either side of a vehicle 16. While the vehicle is illustrated as an articulated wheeled earthmoving unit, it may be appreciated that the roll-over protective structure 10 can be adapted to virtually any type of earth traversing vehicle.

More specifically, the roll-over protection structure 10 includes a pair of substantially upright legs 18, only one of which is shown for illustrative convenience. Each of the legs is of slightly upwardly tapered form as shown by the side view of FIG. 1. Each of the legs includes a relatively rigid base or lower end portion 20 having a flat mounting flange 22 which is disposed in facing engagement with a pedestal plate 24 of the support bracket 12. A plurality of retaining bolts 26 rigidly secure the flange to the plate, and a similar series of retaining bolts 28 attach a base plate 30 of the bracket to the vehicle frame 14.

Each of the legs 18 also has a deformable central portion as shown by the reference numeral 32. The central portion of each leg is fabricated in a substantially rectangular box section configuration as shown in FIG. 3. The leg includes a U-shaped outer plate 34 and an inner plate 36 weldably secured thereto by a pair of longitudinally disposed substantially vertical welds 38.

Each leg 18 further includes a relatively rigid upper end portion 40 which is integrally secured to a box-like cross frame or beam structure shown generally at 42. The transverse beam 42 includes a pair of vertically arranged and longitudinally spaced cross plates 44, a lower horizontally disposed spanning plate 46, and an upper canopy plate 48 which extends forwardly in overlying protective relation to an operation station 50. For purposes of additional strength, a longitudinally extending tapered angle member 52 is weldably secured to a depending outer side surface 54 of the canopy plate 48 on each side of the protective structure 10. Further, a pair of gussets 56 are weldably attached to the angle members 52, the front cross plate 44, and the cover plate 48. An additional U-shaped channel 58 and a front cross plate 60 transversely strengthen the forward portion of the structure.

A transversely disposed box beam shown generally at 62 is weldably or otherwise rigidly secured in interconnecting relation between the lower end portions 20 of the legs. The box beam includes a horizontally disposed cover plate 64, a spaced base plate 66, and a pair of vertically arranged front and rear plates 68. A plate 70, weldably incorporated internally of each leg, is horizontally aligned with the cover plate 64 to provide a relatively rigid substructure.

As best shown in FIG. 2, an upper transition zone or hinge joint indicated generally at 72 is located between the upper end portion 40 and the central portion 32 of the leg 18. A similar lower transition zone or hinge joint identified at 74 is disposed between the base portion 20 and the central portion of the leg. These upper and lower transition zones substantially define plastically deformable hinge joints when the roll-over protection structure is subjected to a force applied laterally or transversely of the vehicle to the outside top member 54 thereof as shown at "F" in FIG. 2. With such a loading, which is projectionally equivalent to the shock loading imposed on the structure due to a vehicle roll-over, the legs 18 tend to be plastically deformed between the hinge joints 72 and 74.

Immediately above the hinge joint location 72 and below the hinge joint 74, the increased transverse cross section provides a relatively more rigid structure which is only deformable in a generally elastic condition. In other words, during a vehicle roll-over, the sturdier sections are not normally strained beyond their elastic limits. However, the transition zones or hinge joints 72 and 74 define zones which are subject to potential strain beyond their elastic limits so that energy is absorbed therebetween through a controlled yielding action. The transition zones are tapered to provide a somewhat narrower transverse width in the central portions 32 when compared with the upper end portions 40 and lower end portions 20 of the legs 18.

ALTERNATE EMBODIMENT

While in the preferred embodiment of the roll-over protection structure the legs 18 and the support brackets 12 are shown as separate components, these elements may be combined to achieve similar operator protection. As best shown in FIGS. 5 and 6, a downwardly extending leg structure 76 includes an integral base plate 78 on each of the legs. Each of the legs 76 is of rectangular fabrication including an inner side plate 80 and an outer side plate 82, as well as a front plate 84 and a rear plate 86.

As shown in FIG. 6, each of the two leg structures 76 includes a relatively rigid upper end portion 92, a more flexible central portion 94, and a relatively rigid base portion 96. Contributing to the strength of the base portion of the legs is a substantially vertically oriented plate 98 and a pair of box-like beams 100 arranged to form a cross bracing integrally secured to the base portion 96. Above this substructure, the transverse cross section of each leg is decreased in a predetermined manner to form a pair of lower deformable hinge joints or transition zones as shown generally at 102 and 104 in a manner comparable to the transition zones of the preferred embodiment. Similarly, a pair of upper transition zones shown generally at 106 and 108 define with the zones 102 and 104 the extremities of the pair of central leg portions 94 of substantially uniform profile and with the individual plates thereof integrally secured to each other by generally vertically disposed welds.

An upper rear portion 110 of the alternate roll-over structure also includes a transversely arranged, inverted U-shaped beam 112 and a pair of laterally spaced, forwardly extending bracing channels 114 which support a protecting canopy 116. With a lateral load "F" applied to the upper part of the structure 76 as shown in FIG. 6, the structure is deflected toward a phantom line position shown at 118. With an increasing force, the material in the area of transition zones 102, 104, 106, and 108, as well as the central portions 94 of both legs, passes beyond the elastic limit to the plastic range where energy of a vehicle roll-over would normally be absorbed.

While the preferred and alternate embodiments of the roll-over protection structure are shown with only two supporting legs, it will be appreciated that the number of legs is incidental to the basic principles set forth above. For example, four or six legs can also be designed with central portions thereof of reduced cross sectional area so that in yielding, energy will be absorbed in a predetermined and controlled manner. It is further apparent that variations might be possible that would fall within the scope of the present invention, which is not intended to be limited except as defined in the following claims.

What is claimed is:

1. A roll-over protection structure comprising;
    a vehicle frame having an operator's station thereon, spaced upright leg means securable to said frame in upstanding relation from said operator's station and having relatively rigid upper and lower end portions, and
    a deformable central portion providing a pair of elevationally spaced upper and lower transition zones of substantially reduced cross sectional area from said upper and lower end portions with said zones being respectively disposed between said upper end portion and said central portion, and between said lower end portion and said central portion so that when subjected to loading during a vehicle roll-over the central portion is effective to absorb energy and predictably deform in locations spaced a predetermined distance from said upper and lower end portions of said leg means and generally contiguously associated with said upper and lower transition zones.

2. The roll-over protection structure of claim 1 wherein said spaced upright leg means includes at least one pair of substantially vertical legs spaced on either side of said operator's station and having inwardly curved upper end portions disposed in spaced facing relation, and an upper canopy supporting beam rigidly interconnecting said upper end portions of said legs above and in shielding relation to said operator's station.

3. The roll-over protection structure of claim 2 including a canopy having rolled side edges secured in overlapping relation to said upper end portions of said legs and to said upper beam and extended outwardly therefrom in overhanging protecting relation with respect to said operator's station.

4. The roll-over protection structure of claim 2 wherein said legs are of fabricated box-section configuration constructed of welds extending generally longitudinally of said legs throughout the entire length of their respective transition zones and central portions.

5. The roll-over protection structure of claim 4 wherein the legs at said transition zones longitudinally inwardly neck down from their respectively adjacent end portions in an arcuately contoured configuration to provide a narrower transverse width in their respective central portions, and including a lower beam mounted on said vehicle frame in transversely disposed interconnecting relation to said lower end portions of said legs.

* * * * *